(12) United States Patent
Schmidt et al.

(10) Patent No.: US 8,573,100 B2
(45) Date of Patent: Nov. 5, 2013

(54) LOADING MAGAZINE WITH MOVEABLE CHANNEL SYSTEM FOR LOADING AND UNLOADING AUTOMATIC LATHES

(75) Inventors: Falk Schmidt, Kuelsheim (DE); Helmut Wichtlhuber, Miltenberg (DE)

(73) Assignee: FMB Maschinenbaugesellschaft mbH & Co. KG, Faulbach (DE)

( * ) Notice: Subject to any disclaimer, the term of this patent is extended or adjusted under 35 U.S.C. 154(b) by 136 days.

(21) Appl. No.: 13/377,655

(22) PCT Filed: Jun. 22, 2010

(86) PCT No.: PCT/EP2010/003758
§ 371 (c)(1),
(2), (4) Date: Jan. 4, 2012

(87) PCT Pub. No.: WO2010/149342
PCT Pub. Date: Dec. 29, 2010

(65) Prior Publication Data
US 2012/0090436 A1    Apr. 19, 2012

(30) Foreign Application Priority Data
Jun. 23, 2009   (DE) .......................... 10 2009 030 251

(51) Int. Cl.
*B23B 13/10* (2006.01)
*B23Q 7/06* (2006.01)

(52) U.S. Cl.
USPC ............................................. 82/126; 82/127

(58) Field of Classification Search
USPC ............... 82/124, 126, 125, 127; 29/561, 563
See application file for complete search history.

(56) References Cited

U.S. PATENT DOCUMENTS

| 5,333,524 | A  | * | 8/1994  | Goforth .......................... 82/127 |
| 5,505,584 | A  | * | 4/1996  | Berns .......................... 414/745.1 |
| 6,024,002 | A  | * | 2/2000  | Ravaioli et al. ................. 82/127 |
| 6,202,523 | B1 | * | 3/2001  | Berns .............................. 82/124 |
| 7,124,880 | B2 | * | 10/2006 | Lee ................................ 198/717 |
| 7,513,181 | B2 | * | 4/2009  | Berns .............................. 82/124 |
| 8,453,544 | B2 | * | 6/2013  | Cucchi .......................... 82/1.11 |

FOREIGN PATENT DOCUMENTS

| DE | 102007009296 A1 | | 8/2008 |
| EP |       384344 A2 | * | 8/1990 |
| EP |      0999003 A2 | | 5/2000 |
| EP |      1637256 A1 | | 3/2006 |
| JP |     02041805 A  | | 2/1990 |

OTHER PUBLICATIONS

Wittmann-Regis, Agnes, "PCT Application No. PCT/EP2010/003758 International Preliminary Report on Patentability Jan. 12, 2012", , Publisher: PCT, Published in: PCT.
Becker, Michael Constantin, "DE Application No. 10 2009 030 251.4 Office Action Dec. 9, 2011", , Publisher: DPMA, Published in: DE.
"International Search Report for Intl Application PCT/EP2010/003758", Dec. 8, 2010, Publisher: EPO, Published in: EP.

* cited by examiner

*Primary Examiner* — Will Fridie, Jr.
(74) *Attorney, Agent, or Firm* — Kaplan Breyer Schwarz & Ottesen

(57) ABSTRACT

The present invention relates to a loading magazine for guiding bar material on an automatic lathe with at least one spindle head that is displaceable in the longitudinal direction. According to the invention, the channel system of a loading magazine of this type is guided on a linear axis and coupled to at least one spindle head, which can be moved in a longitudinal manner, of the automatic lathe such that the bar-guiding channel system can be moved synchronously with the spindle head in drag operation. The formation zones for vibrations in the transition region between the loading magazine and automatic lathe are thus reduced.

14 Claims, 13 Drawing Sheets

LOADING MAGAZINE WITH MOVEABLE CHANNEL SYSTEM FOR LOADING AND UNLOADING AUTOMATIC LATHES

FIELD OF THE INVENTION

The present invention relates to a loading magazine for guiding bar material on an automatic lathe with at least one spindle head that is displaceable in the longitudinal direction.

BACKGROUND OF THE INVENTION

Automatic lathes for metal-cutting machining of bar-shaped semi-finished products, which are referred to below as bar material, are basically known and can be basically divided into three different designs.

A so-called automatic short-turning lathe comprises a fixed spindle head in which a spindle with an associated drive unit is supported. On the side of the spindle head facing towards the process chamber of the automatic lathe a clamping means is provided, which is preferably embodied as a collet chuck or optionally as a jaw chuck. The spindle, which is horizontally supported and rotatably driven in the spindle head, is embodied as a hollow shaft so that the loading with the bar material of an automatic lathe of this type can be carried out via the rear side of the spindle head thereof. For loading, a so-called bar loader is provided on the rear side of the spindle head, which bar loader preferably is embodied as a bar loading magazine. With a bar loading magazine of this type, which is referred to below as a loading magazine, a material bar with its end to be machined is pushed from the rear side of the spindle head through the hollow spindle of the automatic lathe. The bar end is thereby clamped in the collet chuck such that the bar projects into the process chamber of the automatic lathe with an overhang, wherein the overhang essentially corresponds to a desired workpiece length. In the case of automatic short turning lathes, all of the adjusting, infeeding and forward feeding movements necessary for machining are carried out essentially by the carriage, which thus can be moved fully in all spatial directions, i.e., in the X, Y and Z direction.

An alternative design for an automatic lathe for processing bar material is represented by the so-called automatic long-turning lathe, which essentially differs from the automatic short-turning lathe previously described in two points.

For one thing, automatic long-turning lathes have a spindle head that is displaceable in the longitudinal direction, i.e., in the direction of the Z-axis of the automatic lathe. This displacement movement is performed by the drive axle of the spindle head, which drive axle can be controlled by the control of the automatic lathe, wherein as a rule so-called NC axes are used. The forward feed movement in the direction of the Z axis is thus carried out in the long-turning process by the spindle head movement against a tool fixed in the Z direction. The carriage of an automatic long-turning lathe thus performs only adjusting and infeed movements in the X and Y direction.

Furthermore, a category-defining automatic long-turning lathe comprises an additional fixed guide bushing, which is arranged between the spindle head that can be moved in the Z direction and the tool in the process chamber of the automatic lathe and ensures a stable guidance of the bar material to be processed. Since the bar material is held in the loading magazine by a clamping sleeve at the end of a push rod, a synchronization device is necessary in the loading magazine with which the loading magazine can be adapted to the movement of the entire bar material during the forward feed movement provided by the spindle head movement.

As a further design of an automatic lathe, according to recent developments a mixed form of the previously described automatic short-turning lathes and automatic long-turning lathes has become established on the market, which is referred to below as an automatic hybrid lathe. An automatic hybrid lathe of this type operates with a spindle head that is moveable in the longitudinal direction, in contrast to the automatic long-turning lathe, however, does not have a fixed guide bushing in the region of the tool so that the forward feed movement in the long turning process can be shown via the carriage as well as via the spindle head. Compared to the conventional automatic long-turning lathes, the spindle head path of which is limited to approx. 300 mm, automatic hybrid lathes therefore have a larger possible travel for the forward feed movement, which can be up to 450 mm.

The loading magazine respectively provided on an automatic lathe has to securely guide the bar material during the entire processing operation, wherein in this context the suppression of vibrations in the bar material has an essential function. The bar material to be processed is up to 6 m long and has a diameter between 1 mm up to 100 mm with round, tubular, hexagonal or square cross sections. Depending on the cross section and diameter, speeds of up to 15,000 1/min occur, which is why a vibration prophylaxis as well as an active suppression of vibrations is indispensible. These requirements are essentially met by a guidance of the bar material that is as exact as possible.

A particularly advantageous solution for such a guidance of the bar material that is as exact as possible is to support them in a rotatable manner in an oil-filled channel inside the loading magazine. With the rapid rotation of the bar material in the channel, the effect of a hydrodynamic bearing action occurs, whereby the bar material is guided in the loading magazine exactly and thus with low vibrations.

A weak point, however, is the transition region between the loading magazine and the automatic lathe. As a last support point for the bar material a lathe steady is therefore usually provided on the bar exit side of a loading magazine, which lathe steady comprises roller supports or bracket suppers that can be adjusted to the diameter of the bar material. Between the lathe steady of the loading magazine and the clamping means of the automatic lathe, however, there is a considerable transition region, over which the bar material remains without support and in which thus the development zones for vibrations form on the bar material. In the transition region between the loading magazine and the spindle head a transition tube is provided, which is embodied as a telescopic tube in the case of automatic long-turning lathes or automatic hybrid lathes.

In the case of a distance of approx. 400 mm between the loading magazine and the spindle head and a spindle length of approx. 800 mm, a transition region results in the order of magnitude of over 1,000 mm length, wherein with the automatic long-turning lathes and the automatic hybrid lathes the transition region can be increased by the path of the spindle head movement to up to 1,600 mm. The oscillatory behavior in the transition region depends essentially on the length of this transition region.

It is basically possible to improve the guide quality in that the diameters of the spindle and of the transition tube are reduced for thinner bar material, but economic reasons often argue against this, since very complex retooling work is necessary for changing workpiece diameters. For a reduction to smaller diameters various components which are in part difficult to access would have to be replaced in the automatic lathe and the loading magazine, if a drastic reduction in speed is not to be accepted. The latter leads to a marked loss of productivity as a rule.

SUMMARY OF THE INVENTION

Against this background, the object of the present invention is therefore to increase the guide quality of bar material independently of their bar diameter and thus to minimize the problem of the development zones of vibrations.

A loading magazine for guiding bar material on an automatic lathe with at least one spindle head that is displaceable in the longitudinal direction contains a bar material-guiding channel system, which system comprises at least one upper channel, a lower channel and a channel opening system. At least the channel system of the loading magazine is thereby guided on a linear axis and coupled to a spindle head, which can be moved in a longitudinal manner, of the automatic lathe such that the bar-guiding channel system can be moved synchronously with the spindle head in drag operation, wherein a transition tube is provided between the channel system and the spindle head.

The invention thus makes it possible to considerably reduce the distance between the loading magazine and the collet chuck compared to the prior art and to keep it constant over all operating phases. The possibility of the formation of undesirable vibrations on a material bar to be machined is thus substantially reduced.

The channel system is supported in a displaceable manner in the longitudinal direction and can be driven by an NC axis or a linear motor.

Preferably, the spindle head and channel system are coupled to one another by a mechanical connection, wherein the mechanical coupling ensures a synchronous movement between the spindle head and the channel system.

In a particularly preferred embodiment of the invention the longitudinal movement of the channel system mechanically coupled to the spindle head can be supported by the NC axis or the linear motor. The axle drives then operate in the form of a servo drive and thus reduce the forces that have to be applied from the spindle head for the longitudinal movement of the channel system. The drive control can be carried out directly by the loading magazine, so that an interface connection to the automatic lathe is not necessary.

In an alternative embodiment to the mechanical coupling of spindle head and channel system, the control of the NC axis or of the linear motor takes place by the automatic lathe so that the spindle head is coupled to the channel system by an electronic connection.

An additional drive and a push rod with a clamping sleeve can be comprised in the loading magazine, wherein the push rod is moveable with the clamping sleeve in the longitudinal direction and is suitable for the forward feed of the bar material. In a simple embodiment, the drive and the push rod with the clamping sleeve are mechanically coupled to the channel system and are jointly moveable therewith with the bar forward feed.

Alternatively, the drive and push rod with the clamping sleeve can be moved independently of the channel system and thus expediently arranged in a fixed manner in the loading magazine, wherein the control of the push rod is preferably carried out by a synchronization device, whereby path inaccuracies with the forward feed of the bar material can be avoided.

Furthermore, between the loading magazine and the transition tube and/or between the transition tube and the spindle head at least one additional lathe steady can be provided, with which the guidance of the bar material is further increased.

For a further increase of the guidance quality, the diameters of the transition tube and the spindle bore can be reduced by tubular inserts.

One embodiment consequently provides that the loading magazine is to be coupled or is coupled to a spindle head, embodied as a main spindle head, of the automatic lathe for feeding bar material and loading the automatic lathe with bar material.

A further embodiment furthermore provides that the loading magazine is to be coupled or is coupled to a spindle head, embodied as a tailstock, of the automatic lathe for guiding out bar material and unloading the automatic lathe.

A particularly preferred system within the scope of the present invention therefore has an automatic lathe, a first loading magazine according to the invention and a second loading magazine according to the invention, wherein however the first loading magazine is coupled to a spindle head, embodied as a main spindle head, of the automatic lathe, and the second is coupled to a spindle head embodied as a tailstock.

BRIEF DESCRIPTION OF THE DRAWINGS

This and other features as well as further advantages of the invention associated therewith are shown by the following more detailed description of preferred exemplary embodiments with reference to the attached drawings. They show.

DETAILED DESCRIPTION

Figure 1:
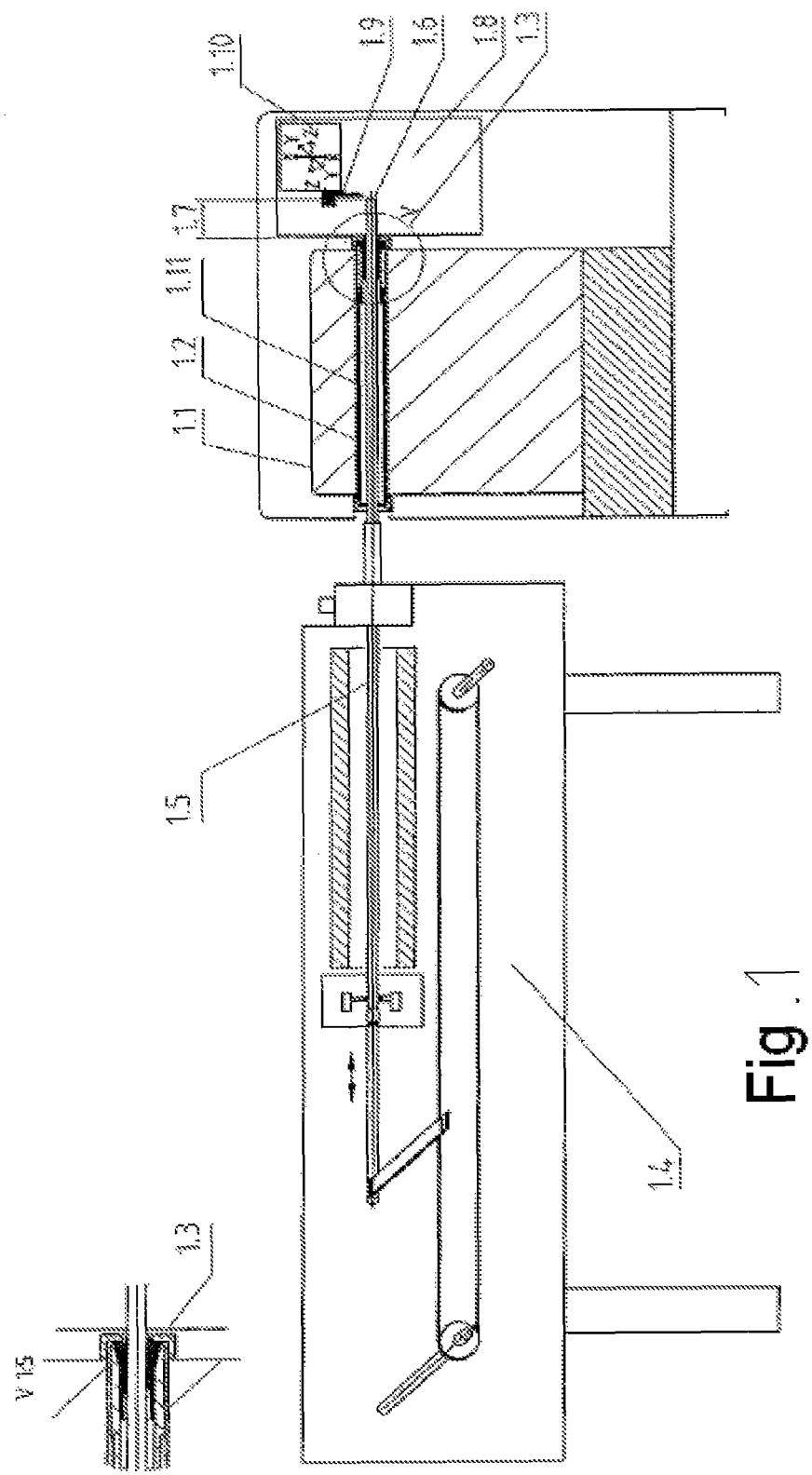
FIG. 1 Automatic short-turning lathe with a loading magazine according to the prior art.

FIG. 1 shows an automatic short-turning lathe with a loading magazine 1.4 for bar material 1.5 according to the prior art. The automatic lathe comprises a fixed spindle head 1.1, which comprises a drive unit and a spindle 1.2. The spindle

1.2 has a longitudinal bore 1.11, through which the bar material 1.5 is to be fed from the loading magazine 1.4 to the automatic lathe. The loading thus takes place via the rear side of the spindle head of the automatic lathe. On the process chamber side end of the spindle a collet chuck 1.3 is shown, with which the bar end 1.6 is clamped such that the bar material 1.5 projects into the process chamber 1.8 of the automatic lathe with an overhang 1.7, which essentially corresponds to the length of a workpiece to be produced. All of the adjusting, infeed and forward feed movements necessary for the turning process are performed by the carriage 1.9, which can perform movements in all spatial directions, in particular also the movement in the direction of the Z axis 1.10, which runs parallel to the center of the spindle and of the automatic lathe.

Figure 2:
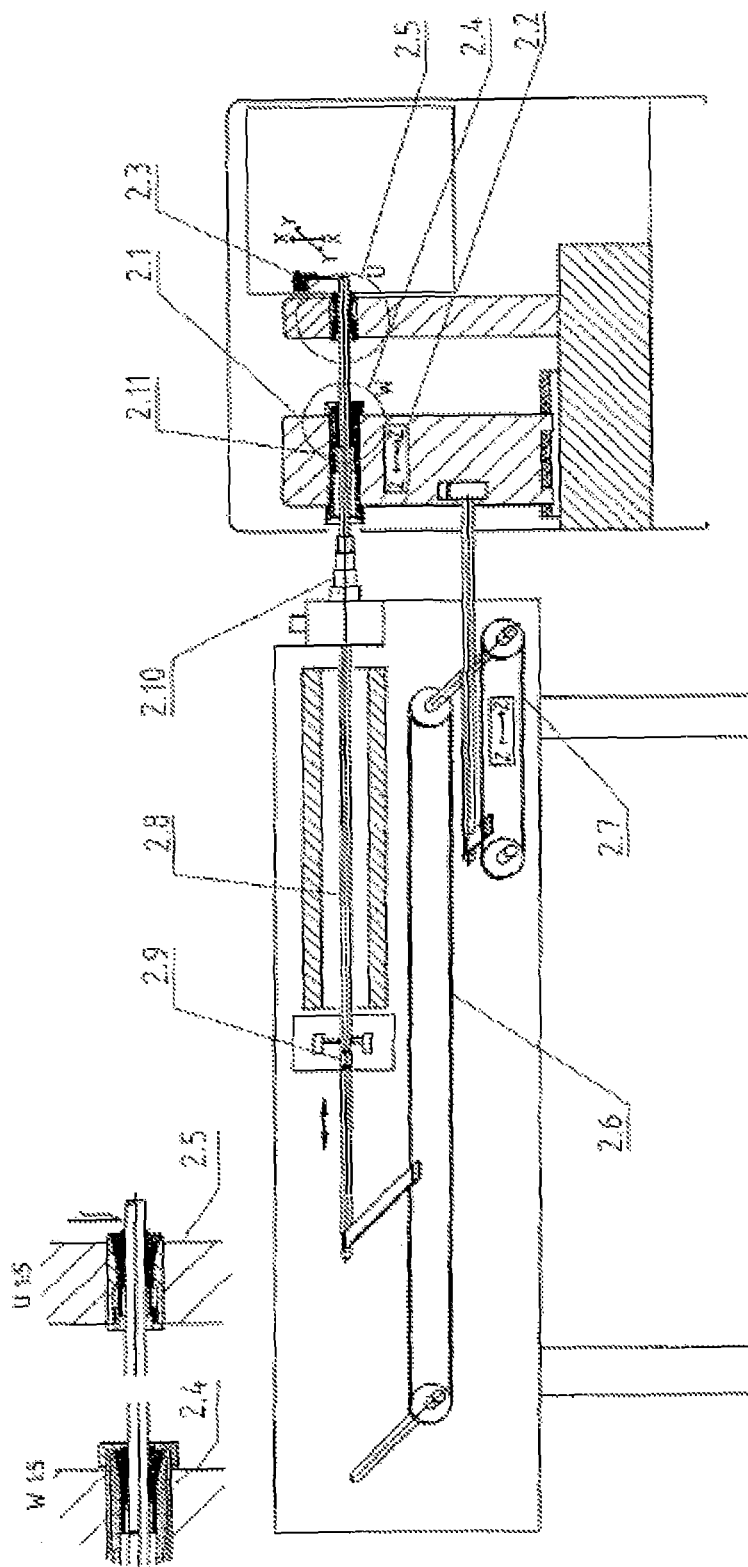
FIG. 2 Automatic long-turning lathe with a loading magazine according to the prior art.

FIG. 2 shows a conventional automatic long-turning lathe with a loading magazine 2.6. The automatic lathe has a spindle head 2.1, which can be displaced in a longitudinal manner in the direction of the Z axis 2.2, wherein the displacement movement is carried out by an individual drive axle (e.g., an NC axis). The spindle head comprises a hollow spindle 2.11 driven in a rotatable manner, on the tool end or process chamber end of which a collet chuck 2.4 is provided, with which a material bar 2.8 guided from the loading magazine 2.6 through the spindle 2.11 is clamped. The tool 2.3 arranged in the process chamber of the automatic lathe performs only adjusting and infeed movements in the X and Y direction. The forward feed movements in the direction of the Z axis necessary for the long-turning process are performed by the movement of spindle head and bar material against a tool fixed in the Z direction. As is shown in FIG. 2, automatic long-turning lathes in addition to the collet chuck 2.4 have a guide bushing 2.5 fixed in the Z direction, which is used to guide the bar material. In addition to a bar-guiding channel, the loading magazine has a push rod driven in the Z direction, at the end of which a clamping sleeve 2.9 is provided to receive the bar material. The loading of the automatic lathe or tracking of the bar material is carried out with the push rod. In order to prevent the material bar 2.8 from being drawn out of the clamping sleeve 2.9 on the push rod side during the longitudinal movements of the bar material caused by the spindle head movements, a synchronization device 2.7, which can be engaged, is provided in the loading magazine. With this device the movements of the push rod are synchronized with those of the bar material.

Figure 3:
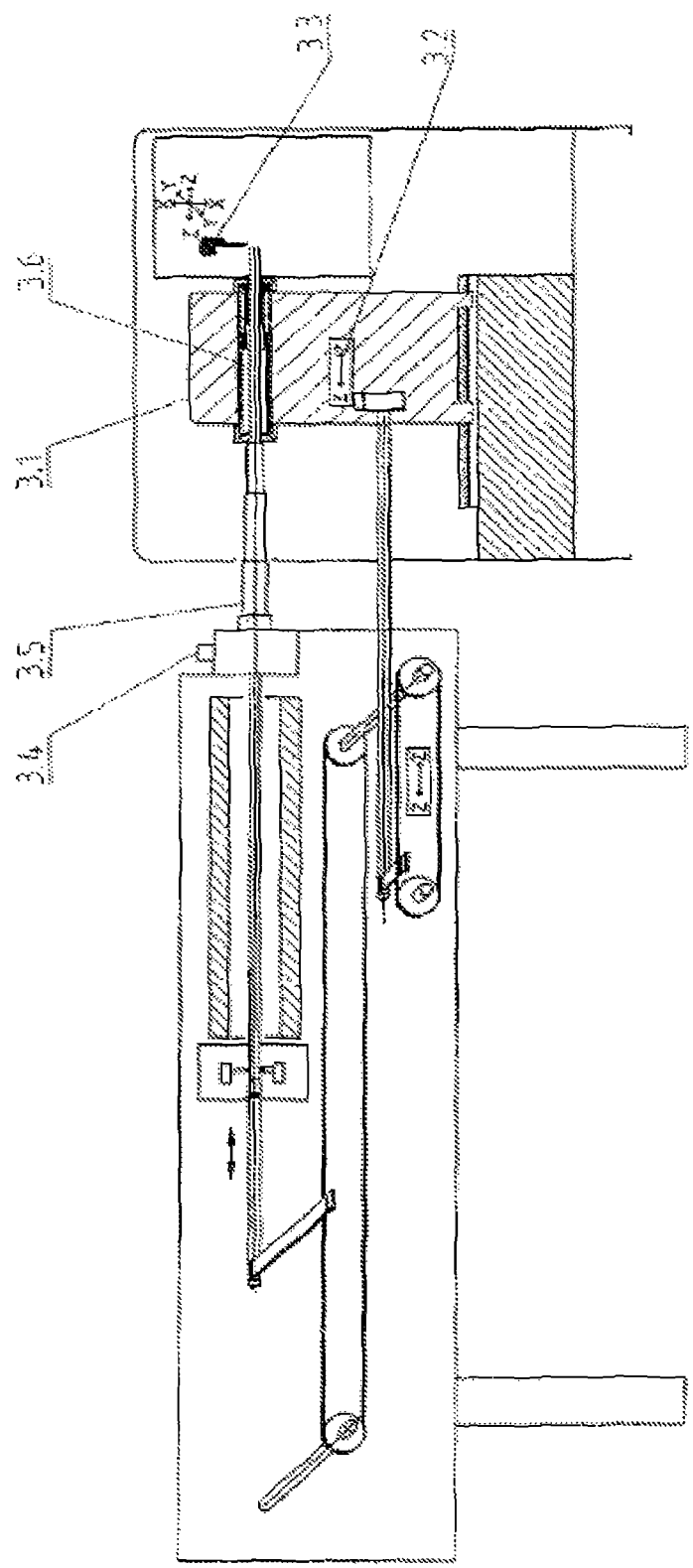
FIG. 3: Automatic hybrid lathe with a loading magazine according to the prior art.

An automatic hybrid lathe is outlined by way of example in FIG. 3. This category of automatic lathes comprises a spindle head 3.1 that is displaceable in the direction of the Z axis 3.2, which is equipped with a hollow spindle 3.6. The forward feed movements in the direction of the Z axis can be shown via the spindle head 3.1 as well as via the carriage 3.3, wherein the carriage is embodied to perform all of the movements in the X, Y and Z direction. The bar material is guided during the turning process essentially from the collet chuck in the side of the spindle 3.6 facing towards the process chamber of the automatic lathe and guided by the loading magazine. In the region between the loading magazine and the automatic lathe there are no devices at all for the support and exact guidance of the bar material. This transition region thus represents a formation zone for the occurrence of vibrations. For vibration prophylaxis on the bar exit side of the loading magazine a lathe steady 3.4 is usually provided which forms adjustable roller supports or bracket supports as another last support point. This is followed by a transition tube 3.5, which is embodied as a telescopic tube with the automatic hybrid lathes as well as the automatic long-turning lathes (cf. FIG. 2), in order to equalize the movements of the spindle head.

In the case of the automatic long-turning lathes (FIG. 2) and automatic hybrid lathes (FIG. 3), depending on the position of the spindle head, a material bar can be guided over a length of up to 1,600 mm without support between the lathe steady and the collet chuck of the spindle.

Figure 4:
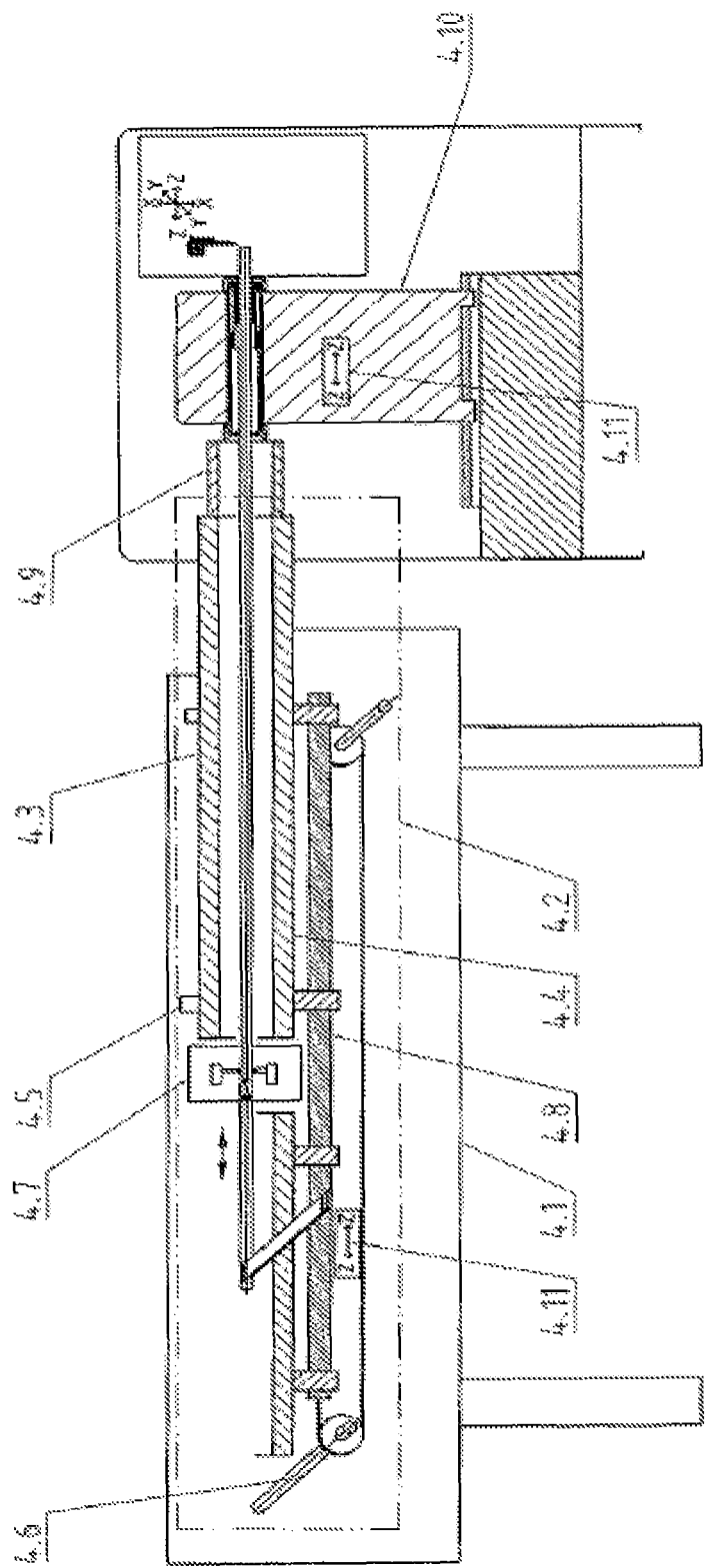
FIG. 4: A first embodiment of a loading magazine according to the invention with a guide channel that is displaceable in the longitudinal direction.

FIG. 4 shows a diagrammatic cross section through a loading magazine with moveable channel system for guiding bar material on an automatic lathe, wherein to this end according to the present invention the bar-guiding channel system is coupled to a spindle head of the automatic lathe in a synchronously moveable manner in drag operation.

In the right part of the drawing an automatic hybrid lathe is shown, which, as already described above, has a spindle head 4.10 that is displaceable in the direction of the Z axis 4.11, with which spindle head during a processing operation the forward feed movements in the direction of the Z axis can be performed at least in part. Alternatively, the present invention could also be used with an automatic long-turning lathe. Since, as can be seen and is described in more detail below, a coupling is given between the loading magazine and spindle head for feeding bar material and loading the automatic lathe, a spindle head of this type is also referred to as the main spindle head.

The loading magazine 4.1 shown in FIG. 4 contains a channel system 4.2, in which a material bar is guided or supported. Channel systems of this type are composed essentially of an oil-filled channel, which can be opened for loading with bar material. To this end the channel is divided into an upper channel 4.3 and a lower channel 4.4, wherein the upper channel is provided as a channel opening system 4.5.

During the turning operation, the oil filling in the channel is set in turbulent flow by the quickly rotating bar material, wherein at least thin bar material is guided by the eddies forming in the oil filling in the center of the channel. In the case of larger diameters, the bar material is guided in the center of the channel via the so-called hydrostatic bearing effect.

The channel system shown comprises a push rod with a gripper or a clamping sleeve 4.7 with which a material bar is held and via a drive 4.6 can be fed in the longitudinal direction through the rear side of spindle head to the automatic lathe.

In a first embodiment according to the invention, it is provided to support in a displaceable manner the entire channel system of the loading magazine, including push rod with drive 4.6 and clamping sleeve 4.7, on a rail system 4.8 or a linear axis in the direction of the Z axis 4.11. At the exit side end of the oil-filled channel a short transition tube is provided, which connects the spindle head 4.10 of the automatic lathe to the channel system in a non-positive manner. The tensile and compressive forces occurring with the spindle head movements in the Z direction can thus be transferred via the transition tube to the channel system likewise supported in a moveable manner in the Z axis.

Compared to the prior art, the distance between the channel system and the collet chuck of an automatic long-turning lathe or an automatic hybrid lathe is considerably reduced and has above all a constant length over all operating phases.

Figure 5:
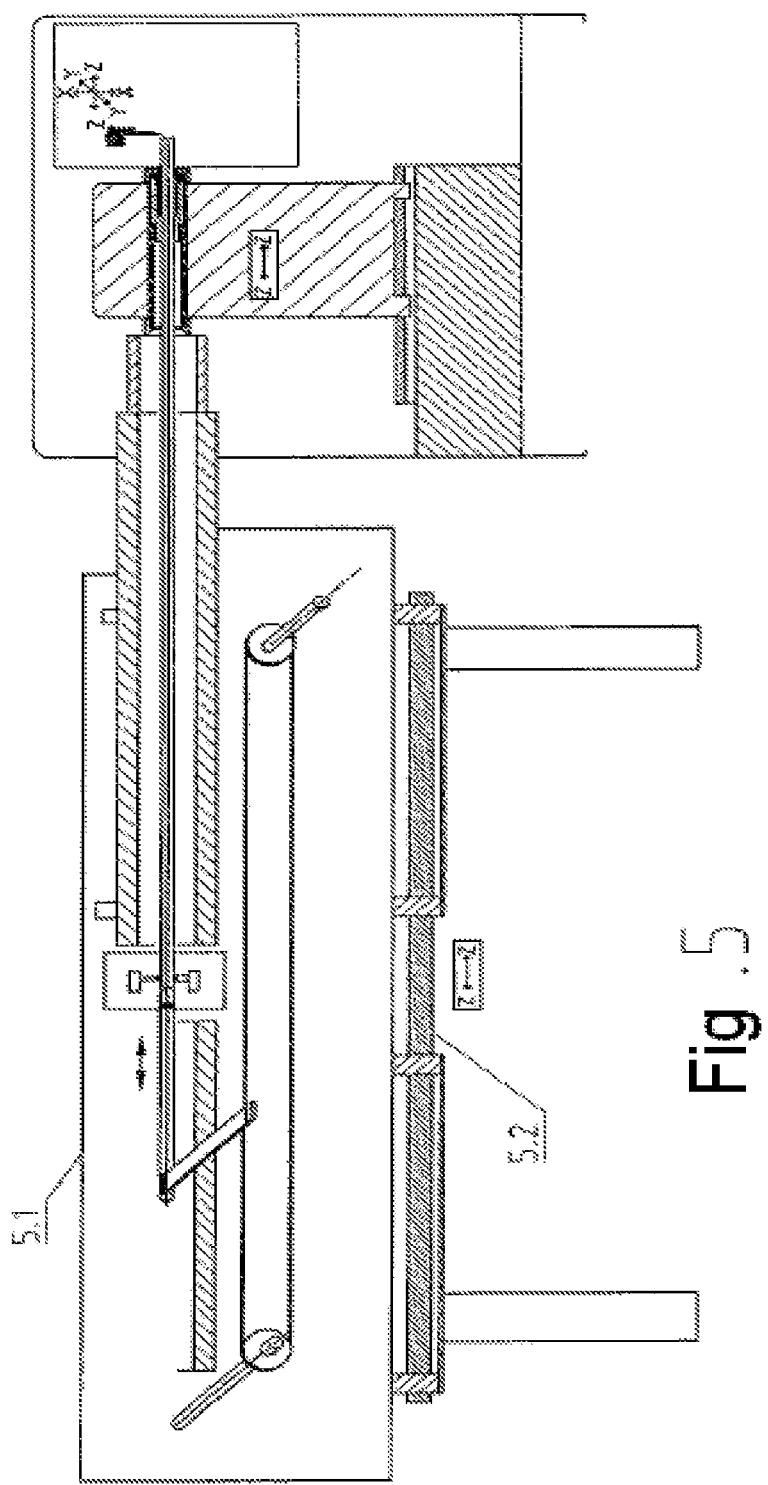
FIG. 5: An alternative embodiment of the invention with a loading magazine that is displaceable in the longitudinal direction.

In FIG. 5 a second, alternative embodiment of the present invention is shown. In contrast to the first embodiment, here the entire loading magazine 5.1 is supported on a linear axis 5.2 and can be displaced in the direction of the Z axis.

Figure 6:
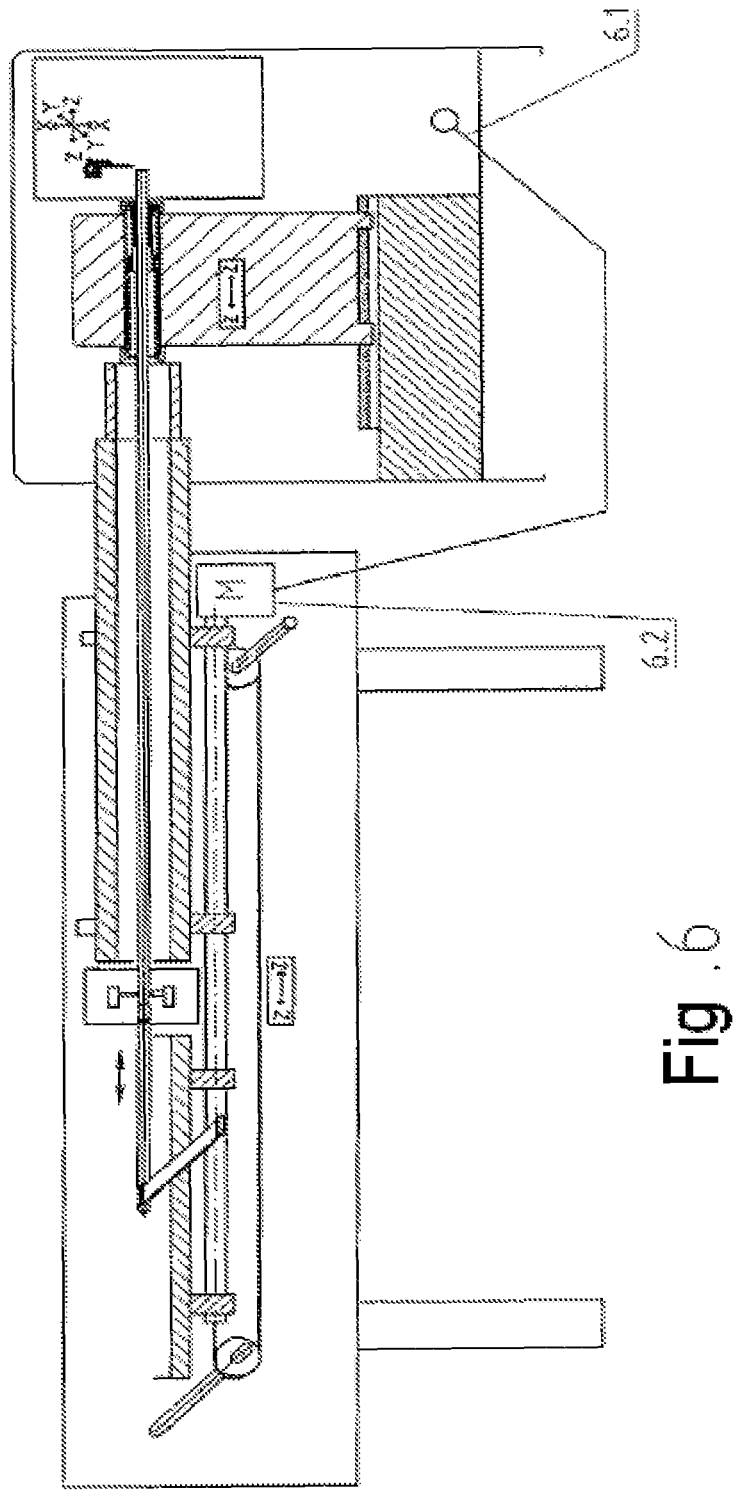
FIG. 6: Loading magazine with an NC axis controlled by the automatic lathe.
Figure 7:
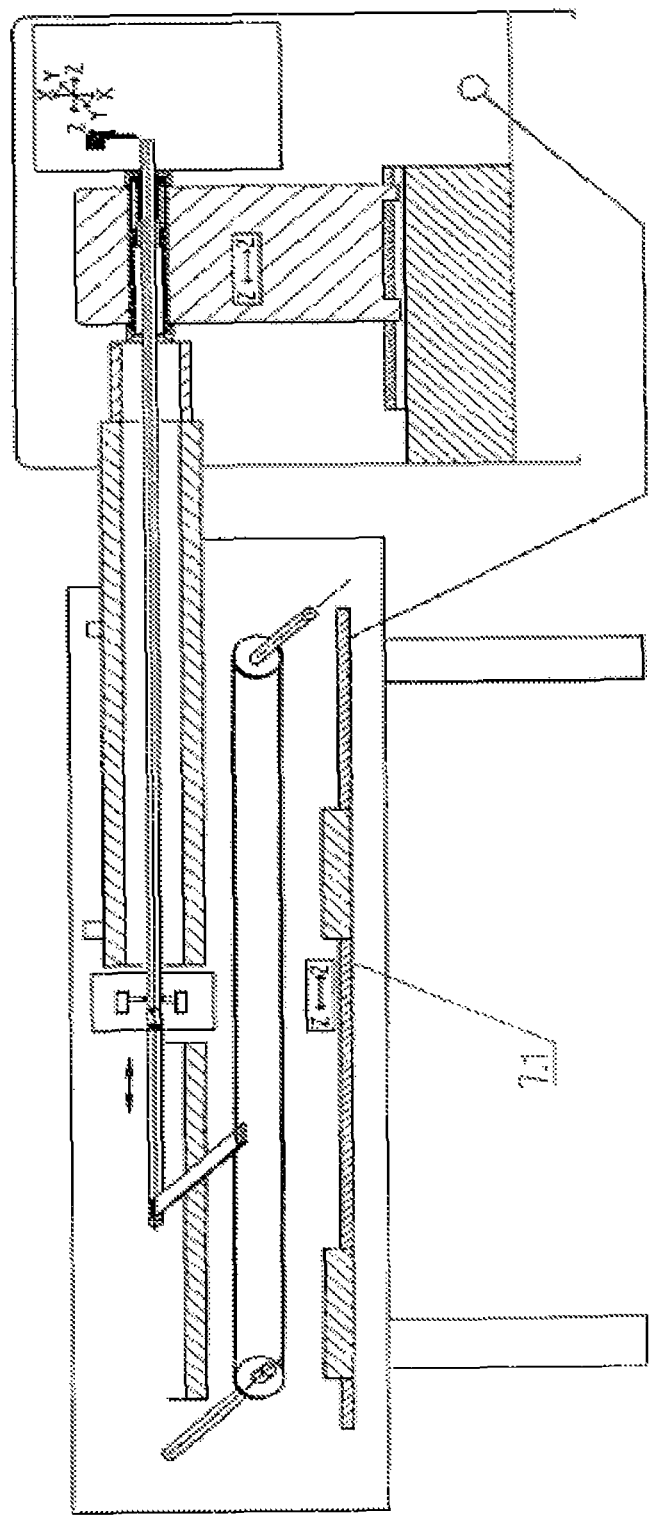
FIG. 7: Loading magazine with a linear axis controlled by the automatic lathe.

FIGS. 6 and 7 show further embodiments of the invention, in which the longitudinal movement of the channel system in the direction of the Z axis is not carried out via a mechanical connection, but is realized via an NC axis 6.2 controlled or regulated by the automatic lathe 6.1 or in the form of a linear motor 7.1. Alternatively, this type of NC axis or a linear motor can be provided parallel to the mechanical connection and contribute in the manner of a servo drive to the reduction of the forces to be applied by the spindle head. In this case, the drives can also be operated without NC control, wherein the drive can be carried out directly by the loading magazine.

Figure 8:
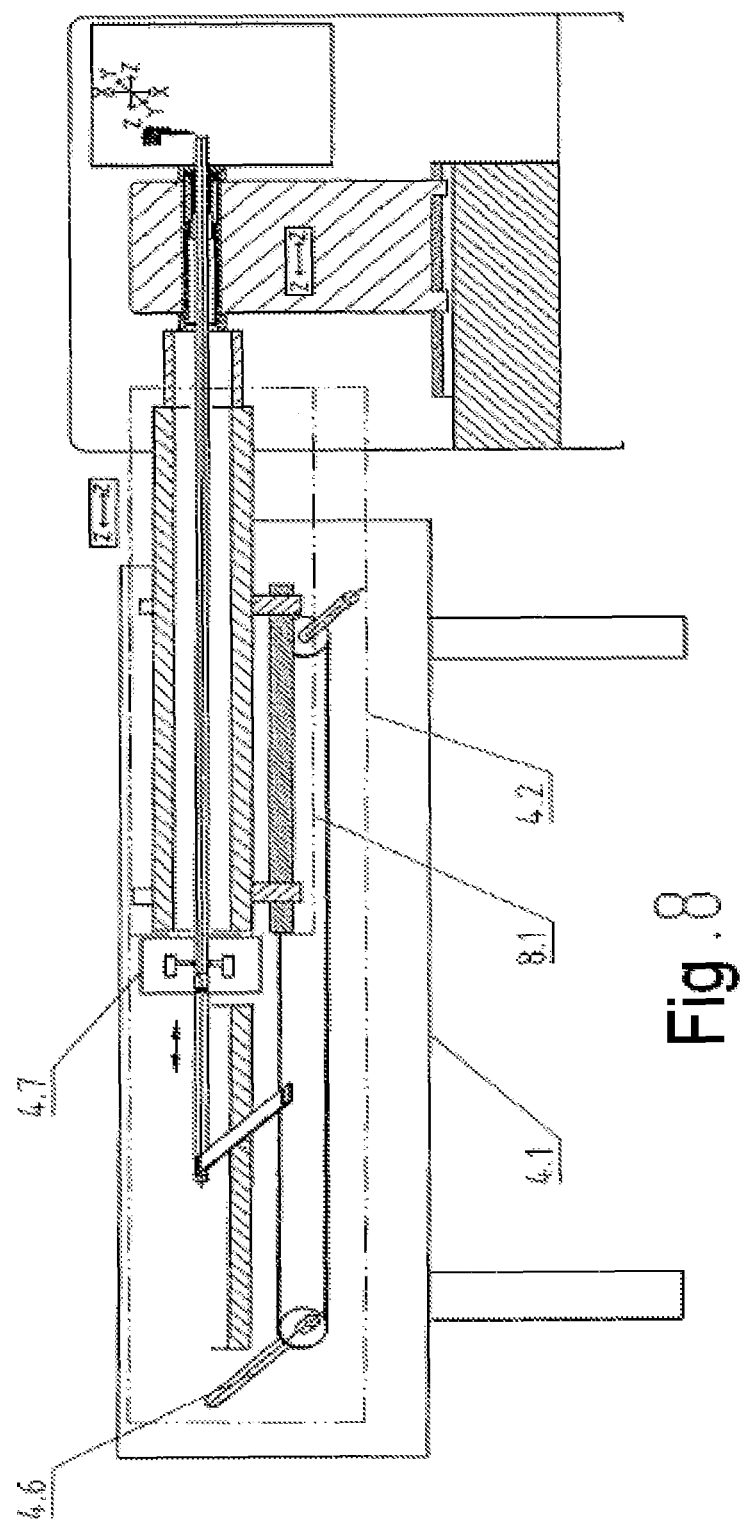
FIG. 8: Loading magazine with a channel system displaceable in a longitudinal manner and a fixed rod drive and clamping sleeve.
Figure 9:
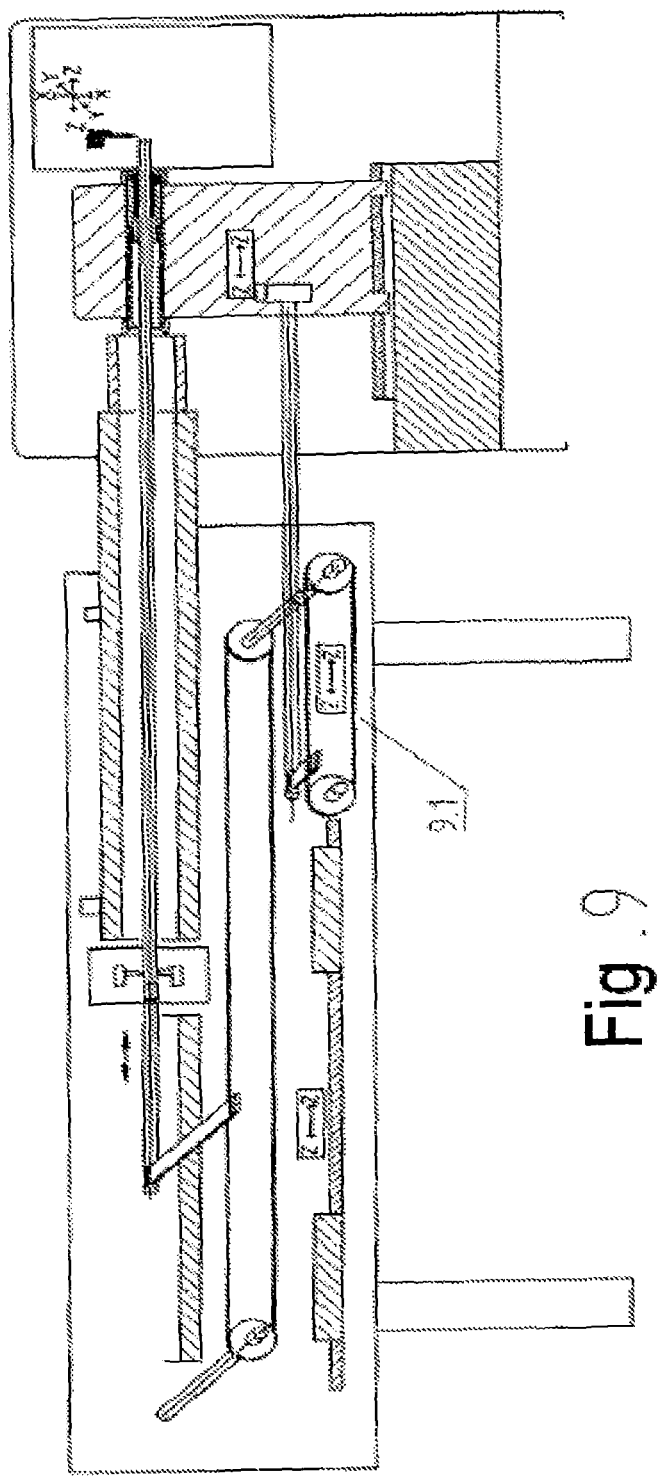
FIG. 9: Loading magazine with a channel system displaceable in a longitudinal manner and a synchronization device to coordinate the bar movement.

In a further variant according to FIG. 8 of the present invention, only the oil-filled channel 8.1 of the channel system 4.2 can be supported displaceably in a longitudinal manner in the loading magazine 4.1 and connected to the spindle head, while the push rod with its clamping sleeve 4.7 and the drive 4.6 is arranged in the loading magazine in a fixed manner. In this case, according to FIG. 9, in addition a synchronization device 9.1 for coordinating the bar movement, in particular for avoiding path inaccuracies, could be used.

Figure 10:
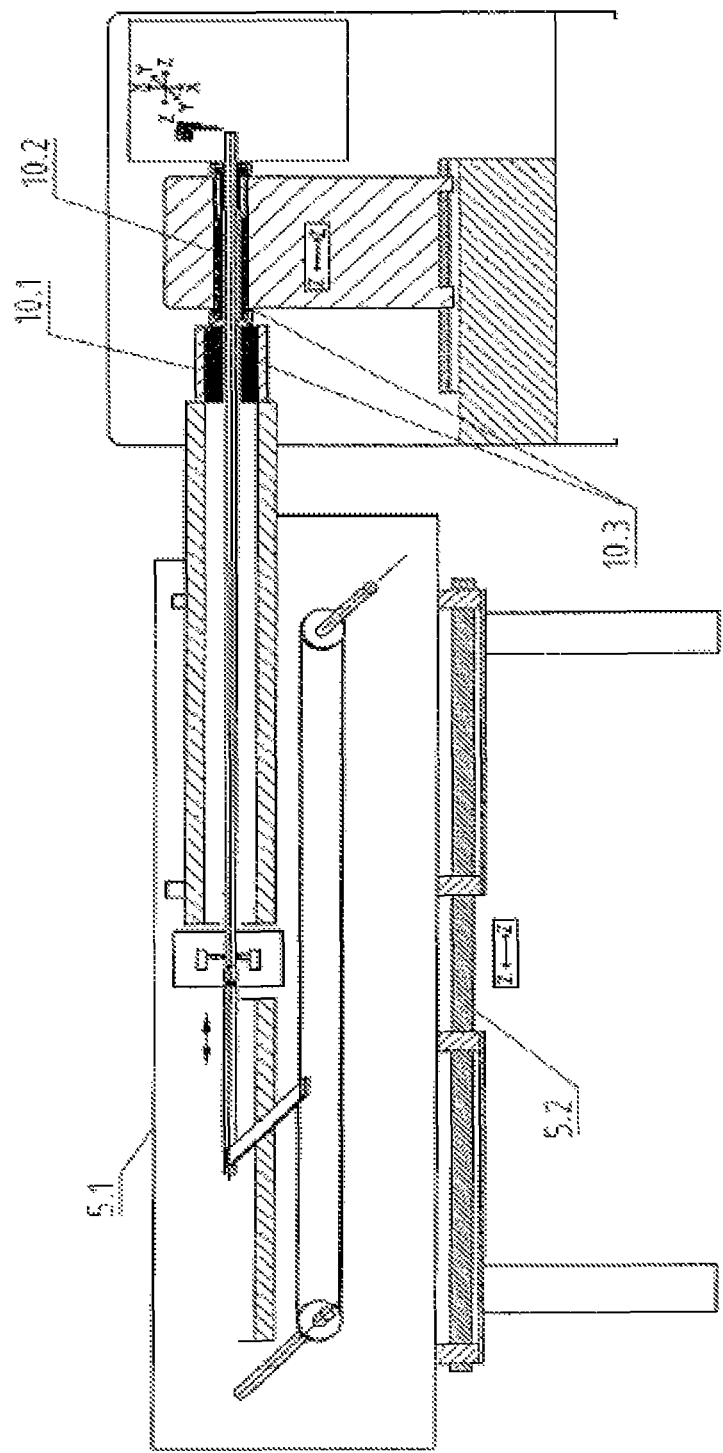
FIG. 10: Loading magazine with insert tubes for reduced bar diameter

An additional vibration suppression can be achieved according to FIG. 10 with insert tubes 10.3, which can be inserted into the spindle bore 10.2 and into the transition tube 10.1 to reduce the diameter.

Figure 11:
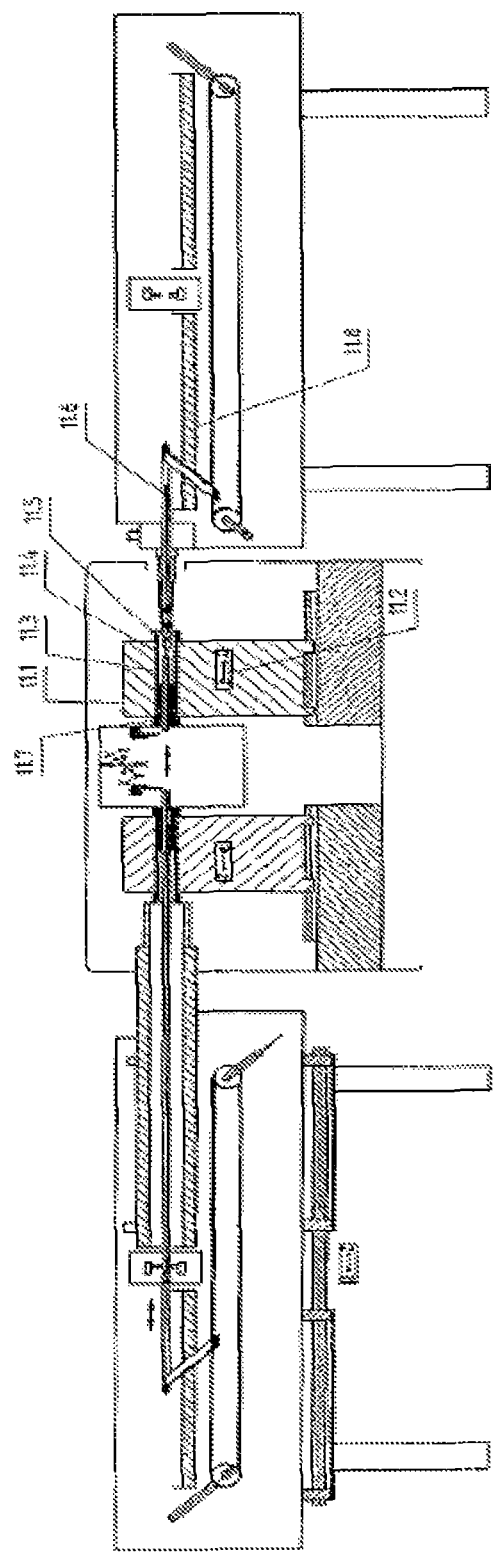
FIG. 11: Unloading device on a tailstock of an automatic lathe according to the prior art.

As shown in FIG. 11, automatic lathes are often equipped with a tailstock 11.1, which is used for machining the rear side of workpieces. A tailstock of this type takes over the workpieces during the movement in the Z direction 11.2 from the spindle head or main spindle head of the automatic lathe. A finished workpiece is thereby removed through the hollow bore 11.4 of the spindle 11.3 in that a spring-loaded clamping sleeve 11.5 is pushed over the workpiece end, which is attached to a push rod 11.6. During the removal, the clamping device 11.7 of the tailstock opens so that the workpiece is drawn out backwards through the spindle.

The design of an unloading device provided on a tailstock can be very similar to a loading magazine for feeding, wherein the channel 11.8 according to the prior art as a rule is embodied as a simple groove with prismatic cross section or a profiled roller guide. For certain applications, in particular in the processing of workpieces that are much longer than the spindle, the same functionalities as a rule are necessary on the tailstock side as with the loading magazines on the side of the main spindle head for loading the automatic lathe.

Figure 12:
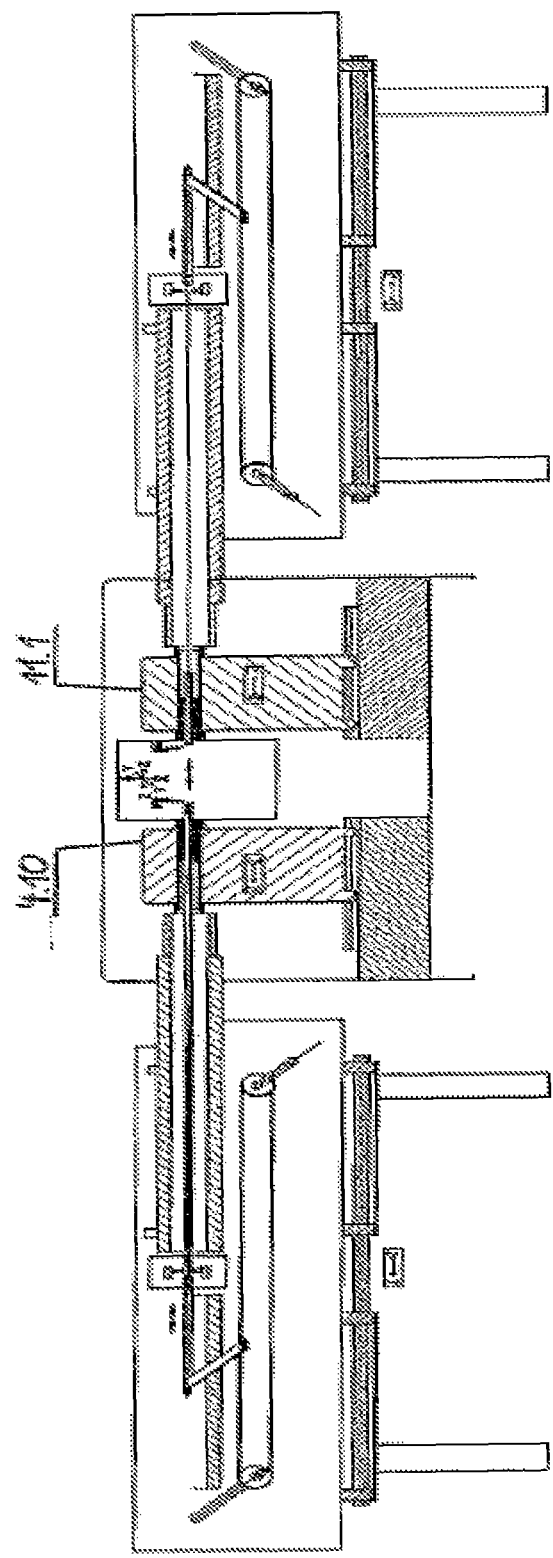
FIG. 12: Unloading device on a tailstock of an automatic lathe with a loading magazine according to the invention.

As shown in FIG. 12, the loading magazine according to the invention is preferably also to be used for guiding out bar material and unloading the automatic lathe, since due to the tailstock 11.1 which is displaceable in the Z direction there are the same vibration problems and connection problems as on the loading side.

FIG. 12 thus shows a particularly preferred system that has an automatic lathe, a first loading magazine and a second loading magazine, wherein however the first loading magazine is coupled to a spindle head 4.10 of the automatic lathe embodied as a main spindle head, and the second is coupled to a spindle stock embodied as a tailstock 11.1.

Figure 13:
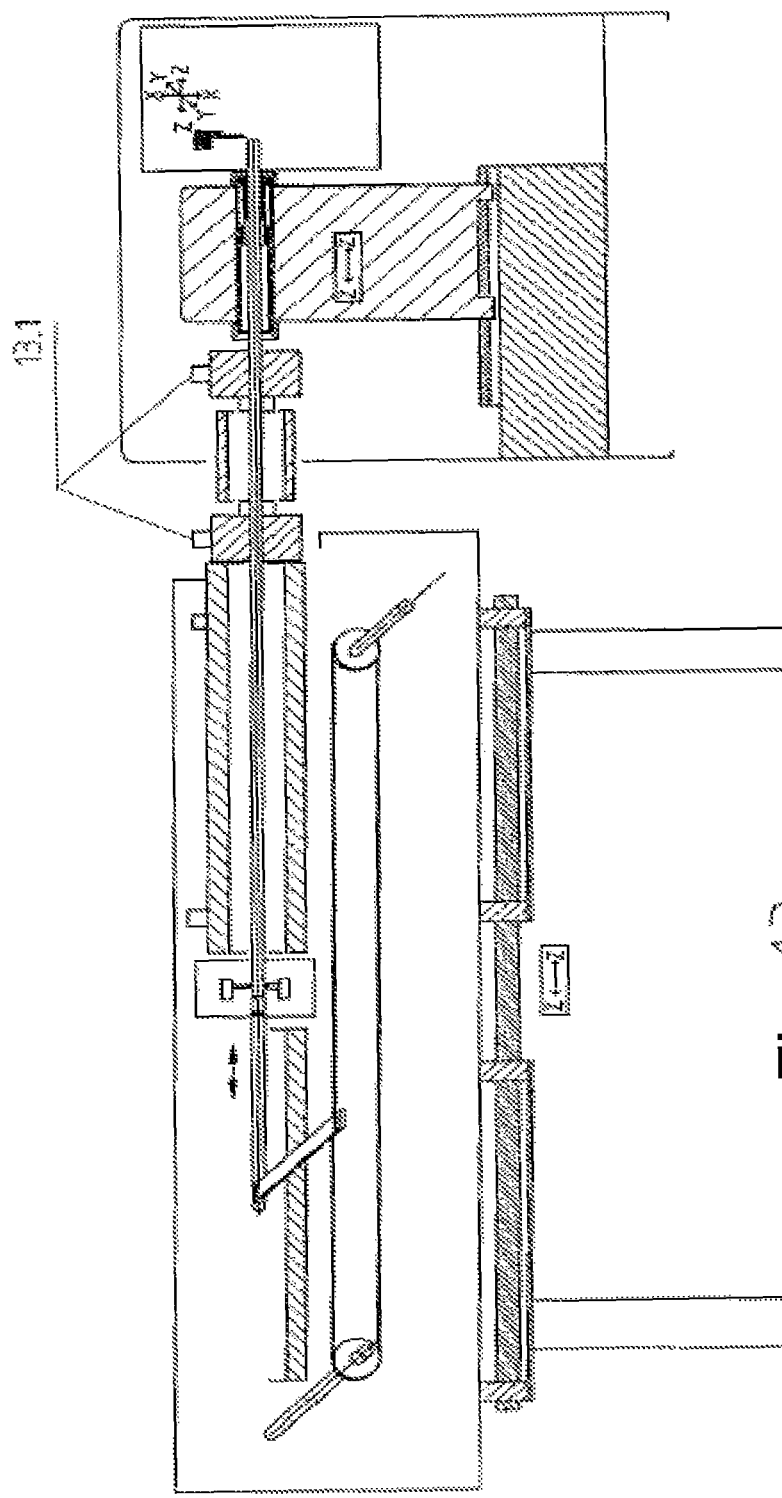
FIG. 13: Loading magazine with lathe steadies for support between the loading magazine and the transition tube as well as transition tube and spindle head.

FIG. 13 shows a loading magazine according to the invention, wherein the additional support of the bar material is provided in the transition region between two lathe steadies 13.1 between the loading magazine and the transition tube and between the transition tube and the spindle head.

What is claimed is:

1. A loading magazine for guiding bar material on an automatic lathe with at least one spindle head (4.10, 11.1) that is displaceable in the longitudinal direction, the loading magazine (4.1) comprising:

a bar material-guiding channel system (4.2) that comprises an upper channel (4.3), a lower channel (4.4) and a channel opening system (4.5), wherein the channel system (4.2) of the loading magazine (4.1) is guided on a linear axis and thereby coupled to the spindle head (4.10, 11.1), which is movable in a longitudinal manner, of the automatic lathe such that the bar-guiding channel system is movable synchronously with the spindle head (4.10) in drag operation, and wherein a transition tube (4.9) is provided between the channel system (4.2) and the spindle head (4.10).

2. The loading magazine according to claim 1, wherein the channel system is driven by an NC axis or a linear motor.

3. The loading magazine according to claim 1, wherein the spindle head (4.10) and the channel system (4.2) are coupled to one another by a mechanical connection.

4. The loading magazine according to claim 2, wherein the longitudinal movement of the channel system mechanically coupled to the spindle head is supportable by the NC axis or the linear motor.

5. The loading magazine according to, claim 2, wherein the control of the NC axis or of the linear motor takes place by the automatic lathe so that the spindle head is coupled to the channel system by an electronic connection.

6. The loading magazine according to claim 1, wherein the loading magazine in addition comprises a drive (4.6) and a push rod with a clamping sleeve, wherein the push rod is moveable with the clamping sleeve in the longitudinal direction and is suitable for the forward feed of the bar material.

7. The loading magazine according to claim 6, characterized in that the drive and the push rod with the clamping sleeve is movable independently of the channel system.

8. The loading magazine according to claim 7, characterized in that the drive and the push rod with the clamping sleeve is movable via a synchronization device (9.1).

9. The loading magazine according to claim 1, wherein the loading magazine is movable jointly with the channel system.

10. The loading magazine according to claim 1, wherein between the loading magazine and the transition tube and/or between the transition tube and the spindle head at least one additional lathe steady is provided.

11. The loading magazine according to claim 1, wherein the diameters of the transition tube (10.1) and a spindle bore (10.2) in the spindle head is reducible by tubular inserts.

12. The loading magazine according to claim 1, wherein the loading magazine is coupled to a spindle head (4.10), embodied as a main spindle head, of the automatic lathe for feeding bar material and loading the automatic lathe with bar material.

13. The loading magazine according to claim 1, wherein the loading magazine is coupled to a spindle head (11.1), embodied as a tailstock, of the automatic lathe for guiding out bar material and unloading the automatic lathe.

14. A system comprising a first and a second loading magazine according to claim 1, and an automatic lathe, wherein however the first loading magazine is coupled to a spindle head (4.10), embodied as a main spindle head, of the automatic lathe, and the second is coupled to a spindle head (11.1) embodied as a tailstock.

* * * * *

UNITED STATES PATENT AND TRADEMARK OFFICE
CERTIFICATE OF CORRECTION

PATENT NO. : 8,573,100 B2  Page 1 of 1
APPLICATION NO. : 13/377655
DATED : November 5, 2013
INVENTOR(S) : Schmidt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 145 days.

Signed and Sealed this
Twenty-second Day of September, 2015

Michelle K. Lee
*Director of the United States Patent and Trademark Office*